Figure 1:
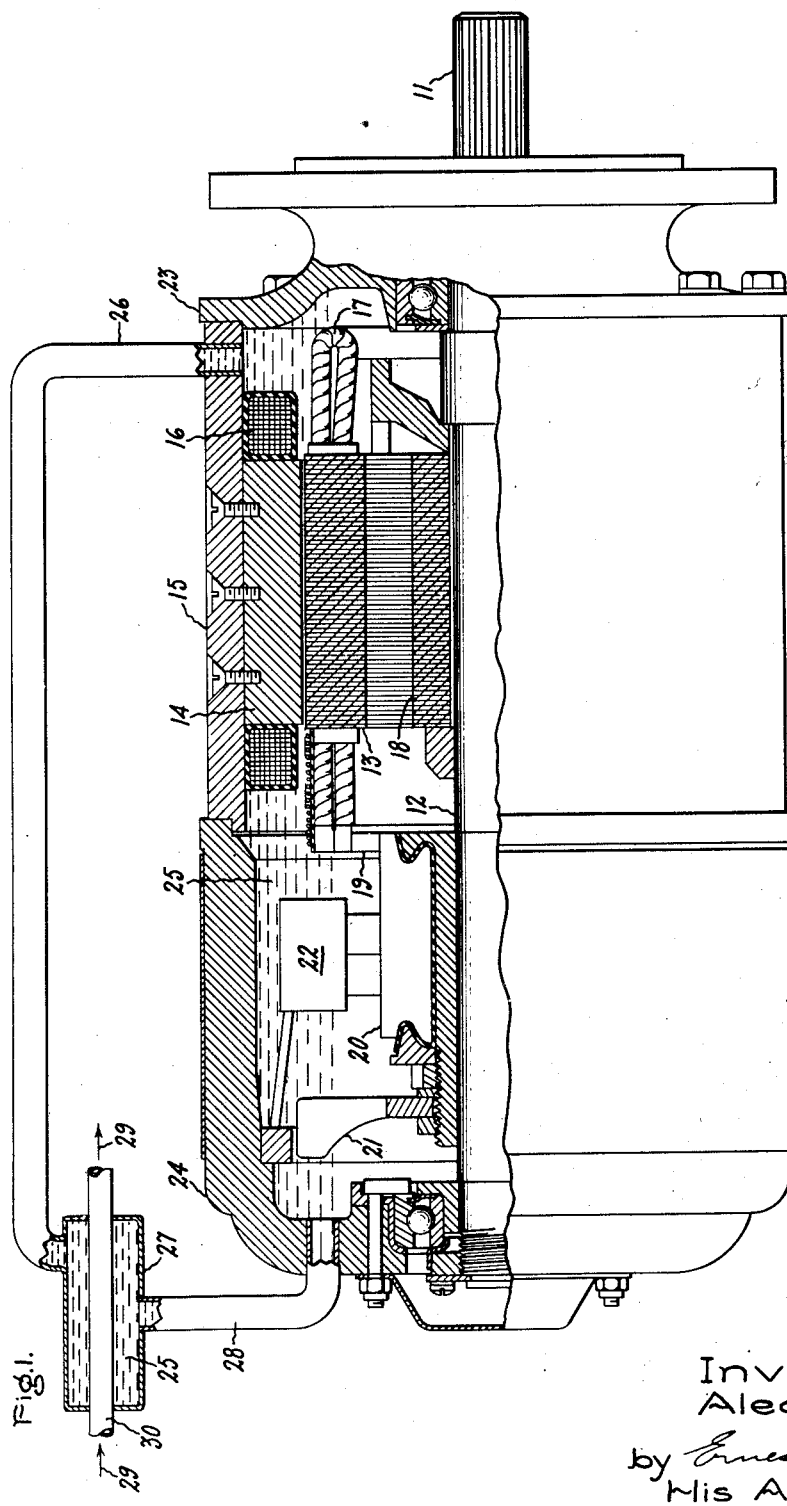

Aug. 12, 1952  A. FISHER  2,606,946
DYNAMOELECTRIC MACHINE COOLING AND BRUSH LUBRICATION
Filed July 19, 1950  3 Sheets-Sheet 1

Inventor:
Alec Fisher,
by Ernest C. Britton
His Attorney.

Aug. 12, 1952          A. FISHER          2,606,946

DYNAMOELECTRIC MACHINE COOLING AND BRUSH LUBRICATION

Filed July 19, 1950          3 Sheets-Sheet 3

Inventor:
Alec Fisher,
by Ernest C. Britton
His Attorney

Patented Aug. 12, 1952

2,606,946

UNITED STATES PATENT OFFICE 2,606,946

DYNAMOELECTRIC MACHINE COOLING AND BRUSH LUBRICATION

Alec Fisher, Lynn, Mass., assignor to General Electric Company, a corporation of New York Application July 19, 1950, Serial No. 174,650

9 Claims. (Cl. 171—252)

My invention relates to dynamo electric machines and has particular significance in connection with an aircraft generator for a high flying airplane.

Heretofore, the electrical systems of airplanes adapted for high altitude operation have presented vexatious problems because excessive heating of all parts, and excessive commutator brush wear, is found to occur at the low air densities and low relative humidities existing at high atlitudes. Brush wear, heating and other high altitude problems are not so serious in the case of most motors used in the electrical system, because they operate only intermittently (such as to adjust wing flaps), but are a considerable problem in connection with the principal generator of the system because it must operate continuously and usually under load conditions.

The answer lies not merely in pressurizing or supercharging the dynamoelectric machine or collector enclosure, for the problem is not merely that of a rarified atmosphere but is that of a dry atmosphere. For example, if the machine was pressurized with the sea level atmosphere of the arctic region on a cold winter day, there would not be anywhere near the requisite moisture to assure proper commutation.

Furthermore, heat dissipation problems are accentuated at modern supersonic speeds because the temperature of the air available for cooling is, because of the heat generated upon impact, often higher than the allowable temperature for the generator.

It is an object of the present invention to provide simple means for overcoming the abovementioned difficulties.

It is a further object of the present invention to provide a liquid filled generator and intercooler system together with means for preventing or minimizing generator brush wear, particularly with high altitude operation and without departing from standard brush manufacturing techniques.

Broadly the means employed in the embodiments herein illustrated and described comprise a direct current generator for a high flying airplane in which the interior of the generator is submerged in a suitable liquid which is cooled in a separate intercooler so that the liquid acts to effectively cool the electrical parts of the machine, and meanwhile the commutator and brushes are sealed in a somewhat separate enclosure and means are provided for pumping a major portion of the entrapped fluid out of this somewhat separate enclosure to maintain proper vapor pressure in the collector housing, thereby to permit good contact between brush and commutator and at the same time prevent dusting away of the brushes.

Figure 2:
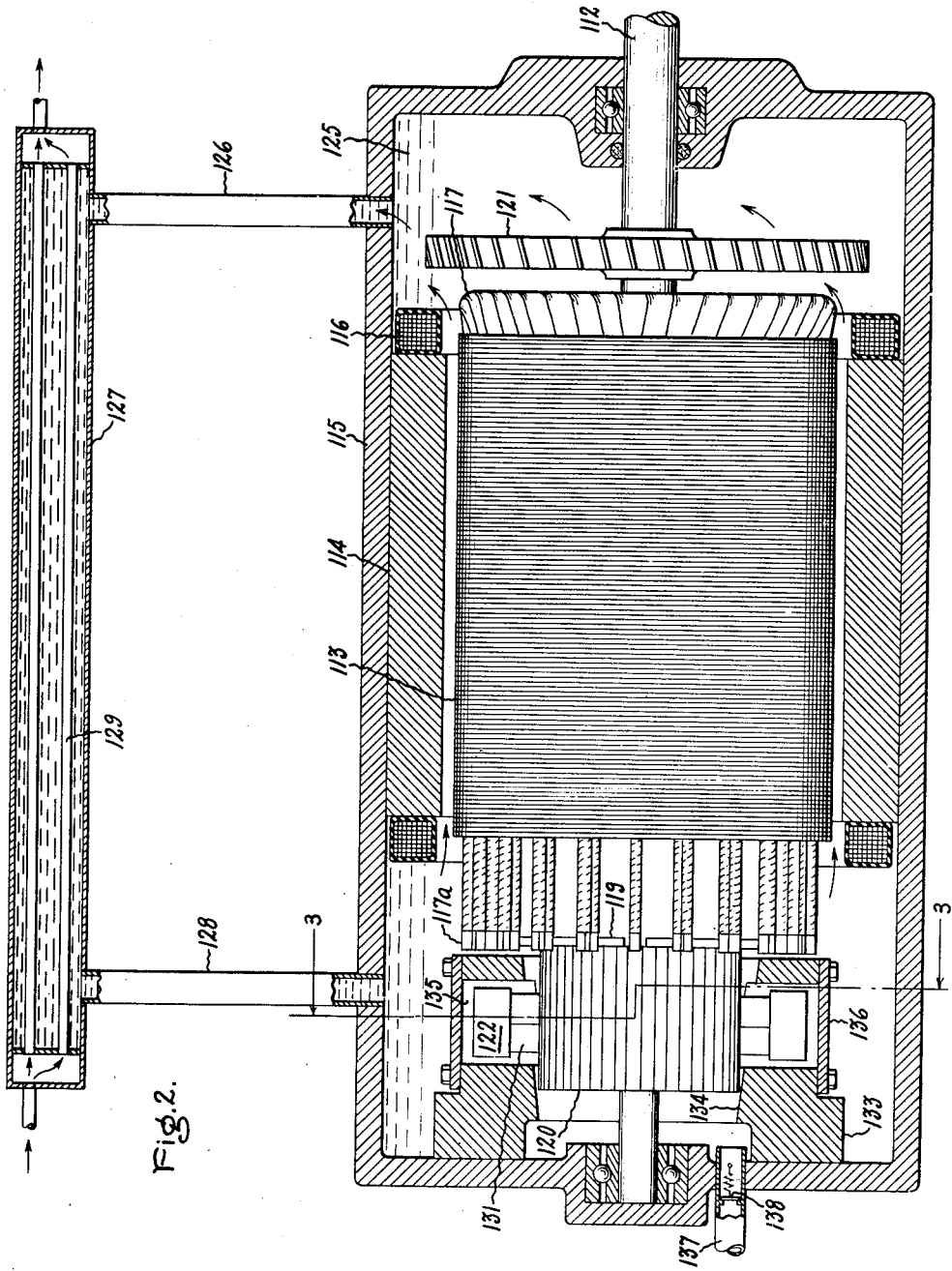
Figure 3:
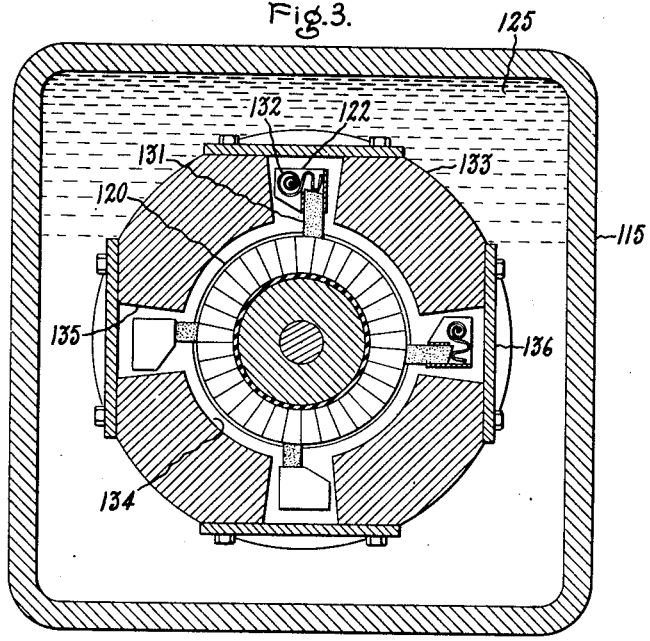
Figure 4:
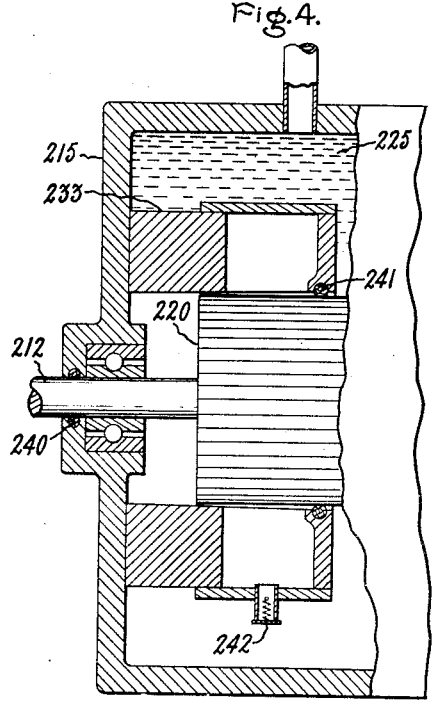

Other objects and advantages will become apparent and my invention will be better understood from consideration of the following description taken in connection with the accompanying drawing in which Fig. 1 is an elevational view (partly in section) of a totally enclosed aircraft generator with a suitable liquid entrapped therein, thereby to provide adequate cooling and brush protection at substantially any altitude; Fig. 2 is a sectional view of a modification showing means for keeping a major portion of the entrapped fluid out of the somewhat separate commutator enclosure; Fig. 3 is a cross-sectional view taken along the line 3—3 of Fig. 2; and Fig. 4 is a partial sectional view of another modification.

In Fig. 1 I have shown a dynamo electric machine such as an aircraft generator adapted to be driven by a source of mechanical power such as a gasoline engine or jet engine (not shown) driving a splined end 11 of a generator shaft 12. Shaft 12 drives a laminated rotor core portion 13 which is arranged to react electrodynamically with a stator core comprising salient field poles 14 joined by a yoke or outer frame 15. Field excitation is supplied through field coils 16 on poles 14 and the rotor 13 is provided with a conventional armature winding 17 and, if desired, axially extending rotor core ventilating passages 18. In more or less conventional manner the armature winding 17 is connected at tapped intervals such as through risers 19 to the individual segments 20 of the machine commutator which is arranged to be driven by the shaft 12 as is an axial flow impeller 21. If desired the commutator risers 19 may be radially spaced from each other so that the ventilating and commutator lubricating fluid may flow from over the commutator and between the brush sets indicated at 22, between the risers and into the ventilating passages 18 as well as into the gap between rotor and stator and between the field coils 16.

The entire machine is arranged to be liquidtight and to this end it is provided with substantially solid end flanges 23 and 24. In order to assure the removal from the core 13 of heat which may be generated therein by eddy currents and by electric current flowing through the armature winding 17, and also in order to insure suitable commutation as hereinafter more fully explained, the entire interior of the machine is submerged in a suitable liquid 25 which is driven axially through the machine by the impeller 21 and out of the machine adjacent the end shield 23 through a conduit 26 and then through an intercooler or heat exchanger 27 and through a conduit 28 back through the other end shield 24 and then back into the fan 21. A number of liquids are suitable for this application, for example, ethylene glycol or diethylene glycol (sometimes known as Prestone or Zerex), halogenated diphenyl (sometimes known as Pyranol), tributyl phosphate, liquid organopolysiloxanes or other silicone oils. Even ordinary engine oil has actually been used by applicant and found to give good results. The liquid should of course have some insulating properties, be non-arcing and non-carbonizing and must not congeal at temperatures apt to be encountered in operation. My invention is not, however, limited to a case where a single type of oil or other liquid is used, but obviously includes a mixture of liquids, for example, a mixture of one selected for its heat conductivity characteristics and another selected for its good vapor characteristics for high altitude brush operation. This liquid 25 is cooled in the intercooler by passing therethrough a separate liquid or gas schematically illustrated by arrows 29 as entering and leaving the intercooler by a separate conduit 30. While at supersonic speeds, air having the impact velocity of the aircraft or other vehicle might not be suitable for this intercooler cooling application, air blast means independent of vehicle speed may be provided, or other fluids may be used, for example, liquid fuel on its way to the aircraft prime mover engine may be passed through conduit 29 with the consequent advantage that little of the heat is lost to the overall system.

With the arrangement just described, cooling of the machine may be adequately taken care of regardless of vehicle speed and, at the same time, means are provided for continually lubricating and wetting the commutator so that the brushes do not rapidly dust away. In order to reduce the rotational losses it is in many cases desirable to fill with a resinous or other composition the interstices between the rotor winding elements (and, possibly, between the stator field windings as well) so that there will be no interrupted surfaces presented to the fluid by these members.

Of course, the different brush sets and also the different commutator segments are operating at different potentials and, therefore, as already indicated, the liquid must be an insulator, at least to some extent, yet it must have a thin enough film thickness to allow each brush to make contact with the commutator or else the actual film thickness must in some manner be reduced as by allowing only a vapor of the liquid to contact brushes and commutator. Thus, in order to assure that the brushes will be in very intimate contact with the commutator, it may be found desirable to exclude a major portion of the fluid from the brushes and commutator as is possible with the embodiments shown in Figs. 2, 3 and 4. As seen in Fig. 2, a shaft 112 is adapted to drive a rotor core portion 113 cooperating with salient stator poles 114 secured to an outer yoke which forms a portion of a fluid-tight case 115. The field poles are provided with field exciting windings 116 and the rotor is provided with an armature winding 117 connected through commutator ears or risers 119 to commutator segments 120. Commutator segments 120 are contacted by brushes 131 secured in brushholders 122 with a conventional spiral spring 132 (see Fig. 3) exerting pressure lengthwise of each brush to cause it to closely contact the commutator.

In Fig. 2 an impeller 121 is shown at the end of the machine opposite the commutator end. The interior of the machine is submerged in a suitable liquid 125 which is forced by the impeller through and around the machine windings and out a conduit 126 to an intercooler 127 and then back to the other end of the machine through a conduit 128. In the intercooler a conduit system 129 provides a heat exchanging path for an intercooling medium.

With the arrangement shown in Figs. 2 and 3 (and also with the modified arrangement shown in Fig. 4 as hereinafter explained) provision is made to allow sufficient liquid or vapor of the liquid to surround the commutator and brushes to prevent brush dusting for requisite high altitude performance, while too must liquid is prevented from interfering with the contact between commutator and brushes by enclosing the commutator and brush sets in a somewhat separate enclosure and providing means to pump oil out of this enclosure or enclosures. Thus, with a substantially complete enclosure about the commutator as provided by an annular member 133 as shown in Figs. 2 and 3, the radially extending, circumferentially spaced, individual commutator ears 119 (or extensions 117a of the armature winding ends axially beyond the commutator ears) are adapted to act as pumping vanes to pump oil away from the commutator without materially affecting the flow of liquid in the remainder of the machine. Alternatively (or, as shown, additionally) other means can be provided to pump out the commutator enclosure such as by utilizing the well known tapered cylindrical gap principle to provide a pumping action. Thus in Fig. 2 I have shown, greatly exaggerated, a tapered gap between the commutator surface and the adjacent inner periphery 134 of the brush and commutator enclosing annular block 133 which is also provided with four pockets 135 for housing the individual brush sets. If desired, the top of the brushes can be made accessible by sealing the pockets 135 with removable caps 136 which can be removed to allow assembly of, and access to, the brushes, brushholders and brush pressure springs.

If desired, there may be added (as shown in Fig. 2) a pipe 137 leading from the outside air into the machine and containing a one-way valve 138 so that when the generator has initially started up (presumably at low altitude although with the invention the ambient humidity is actually of little importance since sufficient vapor for proper lubrication of the collector will be provided by the liquid), outside air can enter the enclosure within block 132 when the liquid is first drawn out by whatever pump action is provided.

In Fig. 4 I have shown a modification in which a machine shaft 212 extends through an enclosing casing 215 with a close seal being formed by an annular sealing ring 240 between shaft and housing to take the place of the one-way valve indicated in Fig. 2. In Fig. 4, a commutator and brush set enclosing housing 233 makes a tapered clearance with a commutator 220 and at the outer end of this tapered clearance, a running seal is provided between commutator and housing by an annular ring 241 designed to provide a regulated leakage at this point. When the machine of Fig. 4 is stopped, the running seal provided by packing 241 will prevent the liquid 225 from running back into the commutator enclosure. Excess liquid may be drained off and returned to the system by a one-way valve 242 and ambient air may enter past seal 240, but at all times sufficient liquid will have passed through the commutator enclosure to provide sufficient vapor for a proper brush lubrication film, or at least it lies within the province of the designer ordinarily skilled in the art to so design the parts as to accomplish this result.

I do not intend that my invention shall be considered limited to the constructions illustrated and described, as it obviously includes the provision of other means for pumping out the somewhat separate enclosure for commutator and brushes, as by providing spiral grooves upon the commutator surface.

The cylinder placed around the commutator in the illustrated embodiments of Figs. 2, 3, and 4 serves to reduce turbulence around commutator and brushes, especially since liquid has been pumped out of the somewhat separate chamber at these points, and with armature and stator completely smoothed out at the so-called "air gap," the rotational losses become merely the equivalent of that obtained in a long, cylindrical bearing, or in other words very low indeed.

Among the advantages of using a liquid rather than a gas for the instant application is that a liquid can be made to more quickly give up its heat in an intercooler and more quickly take heat out of the machine parts to be cooled and there is the additional fact that it would be very difficult to find a gas which would be suitable both for cooling and for acting as a lubricant which will allow satisfactory high altitude commutation.

The liquid-filled commutator type machine used with an intercooler system is adapted to provide constant environmental conditions both to facilitate the cooling of the machine (and incidentally eliminate conventional complicated air blast pipes) and also to prevent or least materially reduce brush wear at altitudes, of, for example, more than three miles above sea level. With either the embodiment of Fig. 1 or that of Figs. 2 and 3, the liquid acts as an insulator for the windings as well as a very efficient cooling medium for the machine and lubricating medium for the commutator. However, the non-arcing and film thickness properties of the liquid become of less importance when an arrangement is used, such as is suggested by Figs. 2 and 3, for pumping a substantial portion of the liquid out of a somewhat separate commutation chamber wherein the liquid has nevertheless been allowed to vaporize sufficiently to prevent brush dusting at high altitudes.

There is thus provided a device of the character described capable of meeting the objects hereinabove set forth and, for example, allowing efficient dynamoelectric machine cooling at supersonic speeds while providing adequate brush protection at altitudes above three miles high.

While I have illustrated and described particular embodiments of my invention, modifications thereof will occur to those skilled in the art. I desire it to be understood, therefore, that my invention is not to be limited to the particular arrangements disclosed and I intend in the appended claims to cover all modifications which do not depart from the spirit and scope of my invention.

What I claim as new and desire to secure by Letters Patent of the United States is:

1. For a commutator type dynamoelectric machine adapted to operate on an aircraft adapted to fly at supersonic speeds at high altitude and in a rarified atmosphere, the combination of a commutator, commutator brushes, an enclosing casing for said machine, an intercooler located outside of said casing, ducts connecting said machine in said casing with said intercooler, intercooler cooling means, a substantially separate enclosure for said brushes and commutator with said substantially separate enclosure being located interiorly of said first casing, a liquid in said casing, in said ducts and in the portion of said intercooler connected to said ducts, and means for pumping a portion of said liquid out of said substantially separate enclosure for said commutator and brushes, whereby said machine may be readily cooled by said liquid and said brush life enhanced regardless of altitude while said liquid is substantially prevented from interfering with the desired electrical contact between said commutator and brushes.

2. For a commutator type dynamoelectric machine adapted to operate on an aircraft adapted to fly at supersonic speeds in a rarified atmosphere, the combination of a commutator, commutator brushes, an enclosing casing for said machine, an intercooler located outside of said casing, ducts connecting said machine in said casing with said intercooler, intercooler cooling means, a substantially separate enclosure for said brushes and commutator with said substantially separate enclosure being located interiorly of said first casing, a liquid in said first casing, in said ducts and in the portion of said intercooler connected to said ducts, means for pumping a portion of said liquid out of said substantially separate enclosure for said commutator and brushes, and one way valve means for introducing atmosphere to said separate enclosure to displace said liquid, whereby said machine may be readily cooled by a liquid which will not interfere with commutation but is adapted to provide a vapor to moisturize the atmosphere surrounding said commutator and brushes and thereby enhance commutation.

3. The combination for operation at a high altitude, of a totally enclosed aircraft generator having a stator core portion comprising salient field poles and windings, a rotor core portion having an armature winding, a commutator connected to said armature winding and axially spaced from said core portions, a plurality of brushes contacting said commutator, a compound filling the interstices between said salient field pole windings to present a smooth inner periphery, a compound filling the interstices between elements of said armature winding and rotor core to present a smooth outer periphery, walls defining a separate enclosure for said commutator and brushes with said separate enclosure being located completely within the main enclosure of said generator, an intercooler arranged separate from said generator, pipes connecting opposite ends of said generator with said intercooler, a mixed liquid completely submerging said stator and rotor core portions and filling said pipes and an associated portion of said intercooler, said mixed liquid comprising a mixture of a first liquid having heat conductivity characteristics and a second liquid having vaporization characteristics to provide a brush life enhancing vapor, and means for pumping a substantial portion of said mixed liquid out of said separate enclosure for said commutator and brushes whereby said liquid will not flood said separate enclosure and prevent good electrical contact between said commutator and brushes.

4. The combination as in claim 3 further characterized by said means for pumping comprising radially extending, circumferentially spaced apart commutator risers joining said armature winding and said commutator.

5. The combination as in claim 3 further characterized by said commutator comprising commutator ears and said pumping means including pumping vanes arranged adjacent the ends of said ears.

6. The combination as in claim 3 further characterized by said means for pumping comprising a configuration of said walls defining said separate enclosure to form with said commutator a wedge shape clearance extending axially of said machine with the mouth of the wedge located at the end of said commutator adjacent said stator and rotor core portions.

7. A high altitude rotating machine for use aboard aircraft, said machine having a current collecting assembly comprising a commutator and brushes, said machine having a liquid tight casing enclosing all of the interior of said machine, and said machine having an annular member located interiorly of said casing and defining a separate enclosure enclosing said current collecting assembly including said brushes, machine ventilating means for causing ventilating liquid to circulate through said machine, and means for exhausting said liquid from said separate enclosure enclosing said current collecting assembly.

8. A rotary electric machine comprising magnetic elements, a commutator, a plurality of brushes contacting said commutator, a liquid tight casing forming an outer chamber within which said magnetic elements, said commutator and said brushes are enclosed, enclosure means defining an inner chamber within which said commutator and brushes are further enclosed, a liquid filling the outer chamber to a point above said magnetic elements, passage means for establishing communication between said inner and outer chambers to allow a portion of said liquid to enter said inner chamber, and means for introducing a gas into said inner chamber to prevent said liquid from submerging said commutator and brushes.

9. The invention as defined in claim 8 in combination with an intercooler heat exchanger heated outside of said machine casing and connected thereto to cool said liquid.

ALEC FISHER.

REFERENCES CITED

The following references are of record in the file of this patent:

UNITED STATES PATENTS

| Number | Name | Date |
|---|---|---|
| 837,033 | Bunet | Nov. 27, 1906 |
| 931,448 | Mattman | Aug. 17, 1909 |
| 1,443,644 | Nobuhara | Jan. 30, 1923 |
| 1,531,724 | Arutunoff | Mar. 31, 1925 |
| 1,938,077 | Lysholm | Dec. 5, 1933 |

FOREIGN PATENTS

| Number | Country | Date |
|---|---|---|
| 170,946 | Great Britain | Oct. 31, 1921 |
| 204,123 | Great Britain | Sept. 21, 1923 |
| 559,354 | France | June 14, 1923 |